Figure 1:
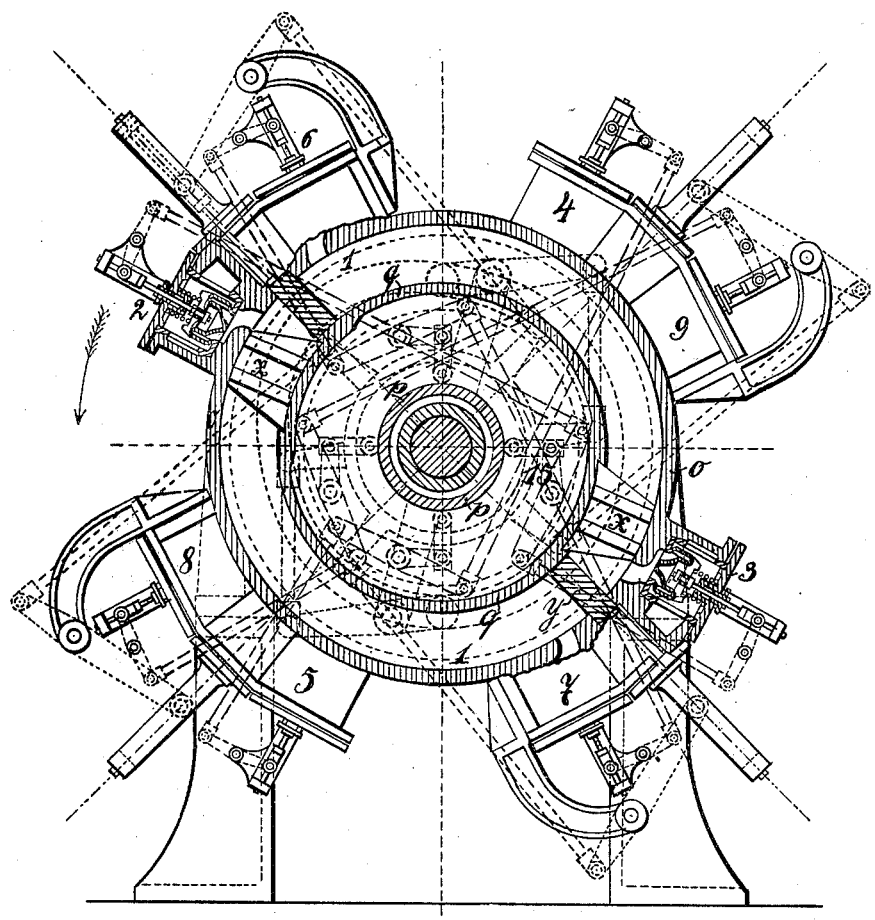

No. 695,095. Patented Mar. 11, 1902.
J. B. EIDEL, Jr. & G. HARTMANN.
ROTARY ENGINE.
(Application filed Mar. 19, 1901.)

(No Model.) 4 Sheets—Sheet 1.

INVENTORS.
Johann Baptist Eidel Junior
Georg Hartmann

WITNESSES:

ATTORNEYS

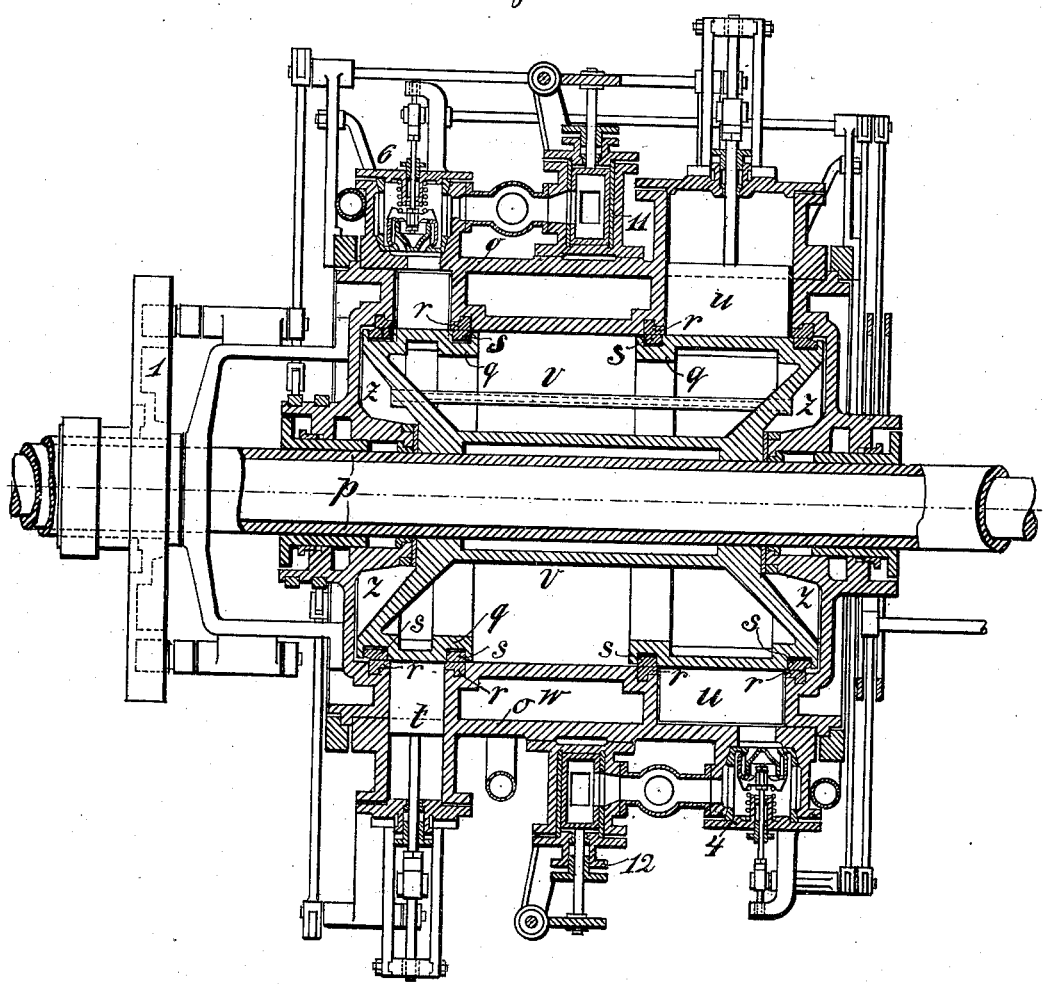

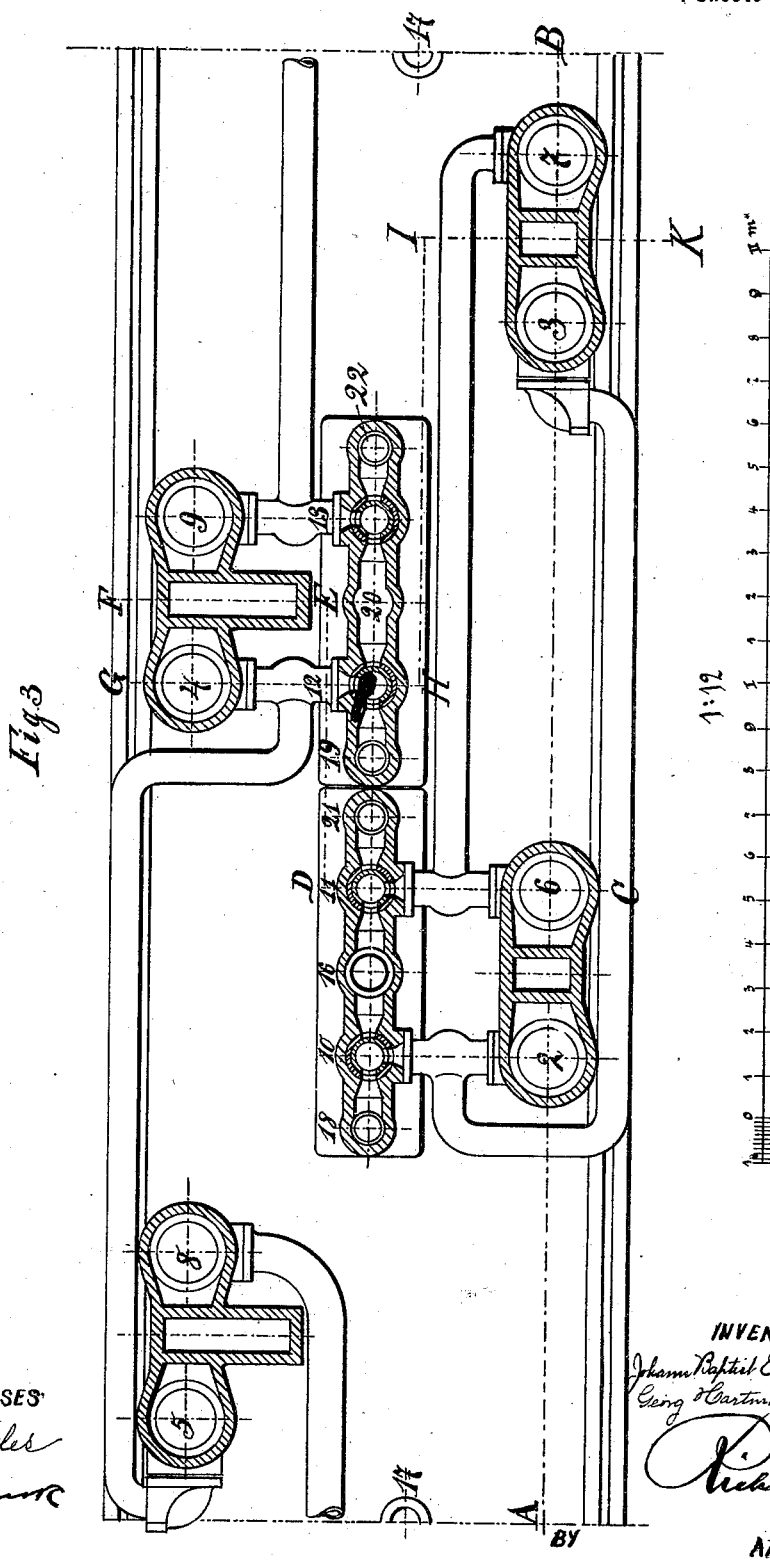

No. 695,095. Patented Mar. 11, 1902.
J. B. EIDEL, Jr. & G. HARTMANN.
ROTARY ENGINE.
(Application filed Mar. 19, 1901.)
(No Model.) 4 Sheets—Sheet 4.

WITNESSES:

INVENTORS.
Johann Baptist Eidel Junior
Georg Hartmann
BY
ATTORNEYS

UNITED STATES PATENT OFFICE.

JOHANN BAPTIST EIDEL, JR., OF KEHL, AND GEORG HARTMANN, OF STRASBURG, GERMANY.

ROTARY ENGINE.

SPECIFICATION forming part of Letters Patent No. 695,095, dated March 11, 1902.

Application filed March 19, 1901. Serial No. 51,893. (No model.)

*To all whom it may concern:*

Be it known that we, JOHANN BAPTIST EIDEL, Jr., brewery owner, of Kehl-on-the-Rhine, and GEORG HARTMANN, engineer, of Strasburg, Alsace, in the German Empire, have invented certain new and useful Improvements in Rotary Engines; and we do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to a reversible rotary engine whereby both the speed as well as the expansive power of the working fluid (steam, gas, explosive mixture, or the like) is used in any desired number of chambers successively in the generation of power. According to its kinematic arrangement the said engine belongs to that kind of rotary engine in which the working fluid is admitted between radially-movable obturating slides and pressure-heads on the rotary coaxial pistons in the generation of power. The engine is capable of being used without alteration of the cylinder-pattern both as a multiple-cylinder compound or multiple-expansion engine, as well as an explosion-motor with multiple expansion.

When used as an explosion-engine, the engine permits an effective cooling of the cylinder-walls and a preliminary heating of the compressed air. For this purpose separate cylinder-compartments are formed from the cylinder and the coaxial piston provided with pressure-heads by using pairs of self-closing packing-rings, and in these compartments turn the pressure-heads mounted on the piston. Between these annular spaces there are formed between the piston and the cylinder other spaces surrounded by a jacket. These spaces when working with steam are heated by means of steam introduced into the jacket and serve as intermediate receivers or spaces and when working with an explosive mixture as cooling-spaces for the cylinder-walls while the jacket receives the compressed mixture or compressed air. In this rotary engine, therefore, the separating-walls, which in other engines of this kind separate the several engines, are dispensed with. By this means also the use of stuffing-boxes for packing the piston-shaft in the interior of the cylinder is obviated, the packing of such stuffing-boxes causing frequent interruptions of working and not being accessible without completely dismounting the engine. Moreover, the obstructive passages for the admission and exhaust of the working fluid required in the cast body of the cylinder and its cover $c$ when separating walls or partitions are employed are dispensed with. This arrangement therefore means an essential simplification and reduction in the cost of a rotary compound or multiple-expansion engine of this kind.

Figure 5:
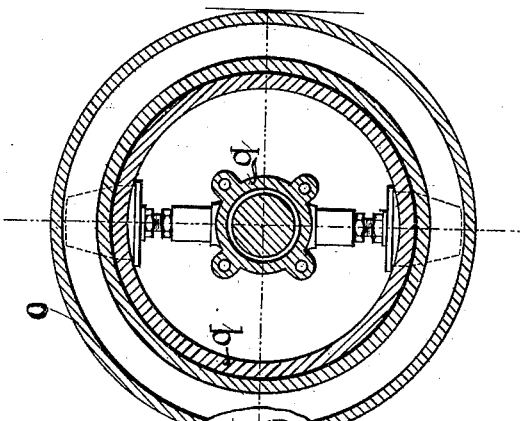
Figure 4:
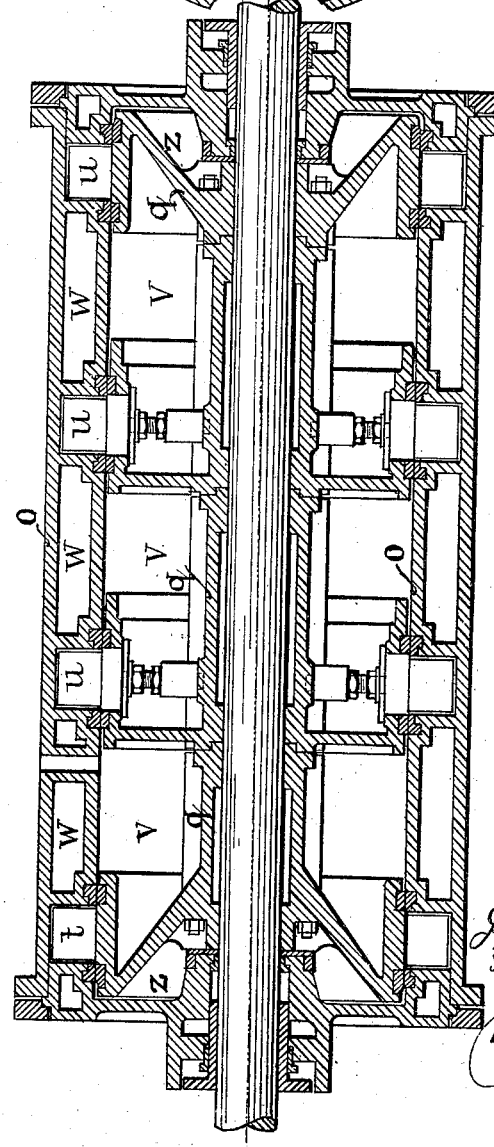

Figure 1 is a transverse section on the line A B of Fig. 3. Fig. 2 at its upper part is a section on the line C D E F and at its lower part a section on the line G H I K of Fig. 3. Fig. 3 is a developed circular section. In Figs. 4 and 5 the engine is shown as a compound or multiple-expansion engine with a number of cylinder-compartments or piston-sections.

For the sake of simplicity the description refers to the first arrangement, since all that is said with respect thereto also applies to the multiple-cylinder compound engine or explosion-motor with multiple expansion.

Between the two coaxial parts of the piston $q$ of the driving-shaft $p$, which are arranged, respectively, in the compartments $t$ and $u$ of the cylinder $o$, is a space $v$, which is surrounded by a jacket $w$. When working with steam, this space $v$, heated by means of steam admitted into the jacket $w$, serves as an intermediate receiver or space and when working with an explosive mixture it serves as a cooling-space for the cylinder-walls, while the jacket $w$ receives the compressed mixture or compressed air. In a known manner stuffing-boxes on the cylinder-covers serve for supporting the driving-shaft $p$. The packing of the two parts of the piston $q$ relatively to the cylinder $o$ is effected by liners $r$ and ordinary spring piston-rings $s$. Each part of the piston $q$ is provided with two pressure-heads $x$, Fig. 1, which are dovetailed into the piston and secured by screws, lie diametrically opposite to each other, and are packed relatively to the side walls and to the cylindrical wall of the corresponding compartment of the cylinder by packing-pieces of cast-iron, steel, or aluminium bronze. The pressure-heads on one part of the piston $q$ are arranged at an angle of one hundred and eighty degrees to those on the other part of the said piston. In accordance with this the slides or shutters $y$ for the one part of the piston $q$ are arranged at an angle of ninety degrees to those for the other part of the said piston. The motion of the slides or shutters $y$ takes place between the working periods by means of the links and levers (shown in dotted lines) from a cam-disk 1, Fig. 2, which is provided with an oval curved groove and is mounted on the shaft $p$. When worked as a compound engine, at each revolution of the shaft steam is admitted to the engines eight times, of which each two admissions are displaced ninety degrees or other desired angle relatively to each other. The admission of steam and the extent of the admission is controlled for both cylindrical compartments and directions of rotation through a positive valve-gear by means of the links and levers shown in dotted lines. When working as a compound engine, the shorter compartment $t$ serves for high pressure and the longer compartment $u$ for low pressure, while the space $v$ serves as an intermediate receiver which is heated by steam introduced into the jacket $w$, as well as by the steam in the adjacent spaces $z$.

For the direction of rotation shown by the arrow in Fig. 1 the valves 2 and 3 are the inlet-valves and the valves 6 and 7 the exhaust-valves for the high-pressure steam, and the valves 4 and 5 form the admission-valves and the valves 8 and 9 the exhaust-valves for the low-pressure steam.

Since the arrangement of the controlling-valves is symmetrical, and since the slides or shutters $y$ are operated similarly in symmetrical positions of the pressure-heads $x$ relatively to the horizontal and vertical planes, Fig. 1, the direction of rotation of the compound engine can be altered by reversing at any moment, by means of a handle, the plugs of the four reversing-cocks 10 11 12 13, (see the development, Fig. 3,) which are connected together in the working positions. In this operation the valve for each compartment of the cylinder, which were previously the inlet-valves, are thrown out of action and are held in their raised position and now serve as outlet-valves through which the exhaust takes place.

A by-pass valve 16, Fig. 3, is arranged between two reversing-valves 10 and 11, of which the latter, when the valve 16 is open, connects the two outlet-valves 6 and 7 of the high-pressure cylinder-compartment $t$ with the intermediate space of the receiver $v$.

When the valve 16 is screwed down, the rotary engine works as a simple expansion-engine with half of the power of the compound engine. By employing a similar screw-down valve for the low-pressure engine this can also work by itself as a simple expansion-engine, as well also as with the high-pressure engine, whereby one and one-half times the power of the compound engine is obtained.

The operation when working compound is as follows: The steam enters the jacket $w$ at 17, Fig. 3, and passes, in the positions of the reversing-cocks shown in Fig. 3, through openings 18 and the cock 10, Fig. 3, to the admission-valves 2 and 3 and in front of the pressure-heads $x$, Fig. 1, of that part of the piston $q$ which lies in the high-pressure cylinder-compartment $t$. After the completion of a half-revolution of the piston $q$ the slides or shutters $y$ of the high-pressure cylinder-compartment $t$ are raised and a passage is opened to the steam through the outlet-valves 6 and 7 of the high-pressure cylinder-compartment $t$, which are held open in the direction of rotation indicated by the arrow in Fig. 1. When the by-pass valve 16 is screwed up, the steam passes on from here through the cock 11 into the intermediate receiver $v$, and after a further quarter-revolution of the piston the steam flows out of the intermediate receiver $v$ through the opening 19 and the cock 12, Fig. 3, to the inlet-valves 4 and 5 of the low-pressure cylinder-compartment $u$. The steam then escapes through the outlet-valves 8 and 9 of this cylinder-compartment $u$, which are held open, and the cock 13 to the exhaust-pipe 20, Fig. 3, or it is conducted from thence to the condenser. When the plugs of the reversing-cocks are turned through ninety degrees, the working steam takes the opposite path. Valves which were previously inlet-valves now form the outlet-valves, and inversely, and the engine runs in the other direction. The boiler-steam then passes through the opening 21 to the valves of the cylinder-compartment $t$, and the steam from the intermediate receiver follows the path through the opening 22 to the valves of the cylinder-compartment $u$.

The above-described rotary engine can also be used without alteration of the pattern as an explosion-engine for gaseous and liquid fuels. For this purpose the annular spaces $t$ and $u$ serve as the working cylinder and compressor, respectively, and $w$ as the receiver for the compressed air. The latter passes, in the same way as the steam described in the operation of the steam-engine, out of the space $w$ into the working cylinder $t$. The cooling takes place in the space $v$ and in the spaces $z$ in such a manner that air is drawn in through openings in the two cylinder-covers and is forced through the piston-arms formed as fan-vanes into the space $v$ and to the periphery thereof. The preliminary heating of the air for combustion and withdrawal of heat from the working space is effected by drawing the said air into the hollow cylinder-cover on the compartment $t$ of the working cylinder. The mixture of the fuel with the previously heated and compressed air and the explosion take place in special arrangements screwed into the cover of the working cylinder and not shown. The explosion and compression periods can be caused to occur at different times, so that any desired compression can be obtained before the ignition. The engine thus contains in its main parts, the cylinder and the piston, the arrangement for working as a compound steam-engine, as well also as the arrangement for cooling the cylinder-walls and for the preliminary heating of the air for supporting combustion when working as an explosion-engine. Moreover, in both cases the engine is capable of being used with its cycle of operation displaced as desired.

What we claim as new, and desire to secure by Letters Patent, is—

1. In combination in a rotary engine, a piston $q$ formed of coaxial portions arranged at a distance from each other, but connected together, separate cylinder-compartments $t$, $u$, for said piston portions, packing-rings between the piston portions and the walls of the compartments, a space $v$ between the piston portions and concentric with the piston-shaft, a jacket $w$ surrounding and concentric with the space $v$ and spaces $z$ between the piston portions and the cylinder-casing, substantially as described.

2. In combination in a rotary engine with the piston and cylinder, a receiver-space $v$, a high-pressure compartment inlet-valves 2 and 3, outlet-valves 6 and 7, reversing-cocks 10 and 11 and a by-pass valve 16 arranged between the two reversing-cocks, said reversing-cock 11 being connected with the space $v$, substantially as described.

In testimony that we claim the foregoing as our invention we have signed our names in presence of two subscribing witnesses.

JOHANN BAPTIST EIDEL, Junior.
GEORG HARTMANN.

Witnesses:
FRANZ EMIL HENN,
FRIEDRICH BALDNER.